United States Patent [19]

Grakov et al.

[11] 4,174,929

[45] Nov. 20, 1979

[54] HIGH PRESSURE PUMP

[76] Inventors: Anatoly N. Grakov, ulitsa Zolotodolinskaya, 29, kv. 424; Oleg I. Grebennik, ulitsa Tereshkovoi, 6, kv. 172., both of Novosibirsk; Jury A. Dudin, ulitsa Parkhomenko, 106, kv. 10, Ufa; Vladimir L. Lutsker, ulitsa Lomonosova, 7/2, kv. 7, Murmansk; Valery N. Makarov, Morskoi prospekt, 5, kv. 43; Viktor M. Ogolikhin, ulitsa Akademicheskaya, 2$^a$, kv. 213, both of Novosibirsk; Tatyana P. Khrustaleva, ulitsa Lyashenko, 6$^a$, kv. 1, Obninsk Kaluzhskoi Oblasti, all of U.S.S.R.

[21] Appl. No.: 777,845

[22] Filed: Mar. 15, 1977

[51] Int. Cl.$^2$ .................. F01M 1/00; F04B 39/02; F16J 18/56
[52] U.S. Cl. .................. 417/437; 277/16; 277/27
[58] Field of Search .................. 417/437; 92/86.5, 82, 92/83; 277/165, 27, 215, 16

[56] References Cited

U.S. PATENT DOCUMENTS

| | | | |
|---|---|---|---|
| 2,366,824 | 1/1945 | Zimmermann | 277/16 |
| 2,828,823 | 4/1958 | Mounce | 277/16 |
| 3,544,118 | 12/1970 | Klein | 277/27 |
| 3,602,613 | 8/1971 | Gunther | 417/437 |
| 3,738,665 | 6/1973 | Bilco | 277/27 |
| 3,742,822 | 7/1973 | Talbert | 417/437 |
| 3,802,805 | 4/1974 | Roeser | 417/437 |

*Primary Examiner*—William L. Freeh
*Attorney, Agent, or Firm*—Haseltine, Lake & Waters

[57] ABSTRACT

A high-pressure pump includes a housing accommodating a movable piston. The piston defines a chamber which is divided by means of a partition member into two spaces substantially insulated from each other. One space communicates with a working medium source and with a consumer via non-return valves. The other space communicates, on one side, with a source of sealing medium via a non-return valve, and on the other side, with the same source, via a slit seal formed between the pump housing and the piston. The partition member is movable and is mounted coaxially with the piston. In order to limit the displacement of the partition member during the intake stroke within the housing, there is provided a stop mounted within the space communicating with the working medium source and rigidly connected with the pump housing.

2 Claims, 4 Drawing Figures

HIGH PRESSURE PUMP

FIELD OF THE INVENTION

The present invention relates to positive-displacement hydraulic machines, and more particularly to high-pressure pumps.

BACKGROUND

The present invention may be advantageously used for producing high-velocity jets of low-viscosity liquids. Use of such jets for cutting and dimensional machining of materials, cutting and demolishing of rocks and structural members, cleaning various types of metal production and chemical equipment offers a number of advantages as compared with conventional production processes, such as an improvement of labor productivity and safety, savings of materials, pollution reduction and the like.

The most preferable field of the invention is cleaning of castings from high-strength moulding sand, such as the removal of core sand from the inner cavities of turbine blades to be cooled during operation, the cavities having a substantial extent with small cross-sections and intiricate configuration.

Producing high-velocity jets of low-viscosity liquids requires elevated pressure levels. It should be, however, noted that an increase of working pressure level was hampered by a movable contact seal which was prone to a rapid wear during operation due to high contact pressure which was proportional to the working pressure. In addition, high contact pressure in the friction pair piston/contact seal resulted in a considerable increase of friction forces whose work was completely converted into heat thus resulting in considerable heating of component parts thereby leading to scoring and jamming of movable parts and to destruction of the contact seal. The attempts to prolong the service life of pumps brought about the development of contactless seals.

Employment of contactless seals for conventional low-viscosity working fluids having the viscosity which is substantially unchanged with pressure increase (for example, water) resulted in considerable energy losses due to a leakage of a certain part of liquid through a slit space thus impairing the pump efficiency. The energy associated with leakage was released in the form of heat in the slit seal zone and resulted in heating, scoring and jamming of movable parts of the pump.

The above-mentioned disadvantages have been eliminated by using, in high-pressure pumps, two different liquids rather than one: one liquid is a working liquid having physical properties which are required for a predetermined production process, and the other liquid is a sealing liquid having a high viscosity which is considerably increased with pressure growth.

This high-pressure pump using liquids of different viscosity comprises a housing accommodating a movable piston defining a space communicating with a working liquid source and with a user via non-return valves. There is provided another space between the piston and the housing which communicates with a source of a sealing liquid via radial passages of the housing. This space communicates, via a slit seal comprising an annular space between the piston and the housing, on one side with the working liquid space and on the other side, via another slit seal comprising an annular space between the piston and the housing, with atmosphere.

The source of a sealing liquid is under pressure which is greater than the delivery pressure of the pump.

In the course of reciprocations of the piston in the housing, the working liquid flows through the intake and delivery non-return valves and is fed to a consumer under a desired pressure.

The sealing liquid is fed from the source under a pressure which is greater than the working liquid pressure and is constantly admitted, via a radial passage of the housing, to the sealing liquid space and discharged, via the slit seals, into the atmosphere and into the working liquid space thus insulating the working liquid from atmosphere and providing lubrication of the parts in frictional engagement.

The main disadvantages of the above-described pump are as follows:

the use of an auxiliary source of a sealing liquid under a pressure which is greater than the working pressure of the pump which results, among other things, in additional energy losses;

penetration of considerable amount of sealing liquid into the working liquid which requires either use of liquids having similar properties or provision of an auxiliary device for separating the sealing liquid from the working liquid;

discharge of the sealing liquid into atmosphere and feeding it back into the sealing liquid space which is associated with additional energy losses;

insufficient cooling of parts in frictional engagement since the piston moves in the zone of two slit seals. This fact is especially important for high-speed pumps;

considerable size of the pump, especially the length due to the provision of two slit seals.

Another conventional construction of a high-pressure pump partially eliminates the above disadvantages.

Said construction comprises a housing accommodating a movable piston defining a chamber, a partition member movable coaxially with the piston which divides the chamber into two spaces substantially insulated from each other. One space communicates with a source of working liquid and with a consumer via non-return valves, and the other space communicates, on one side, with a low-pressure sealing liquid source via a non-return valve, and on the other side, with the atmosphere via a slit seal comprising an annular space formed between the piston and the pump housing. The housing of the pump is provided with a stop for limiting the displacement of the partition member during the intake stroke which is mounted within the sealing liquid space.

Low-pressure sources of sealing and working liquid comprise low-pressure pumps supplied from tanks.

During the reciprocations of the piston in the housing, the working liquid flows through non-return intake and delivery valves and is fed to a consumer under a desired pressure.

Pressure from the pump piston is transmitted to the working liquid through the sealing liquid and partition member.

During the delivery stroke of the pump, the non-return intake valve is closed and the non-return delivery valve is open for feeding the working liquid to a consumer under a desired pressure.

During this stroke, the non-return valve connecting the sealing liquid space to the low-pressure pump is closed. The partition member moves coaxially with the piston in the same direction therewith, but at a lower speed which is determined by a predetermined discharge of the sealing liquid into atmosphere through the slit seal. As a result, the partition member is brought closer to the pump piston during the delivery stroke.

During the intake stroke, the non-return delivery valve is closed, and the intake valve is open. The working liquid is fed from the pump operating under a pressure above the pressure of the sealing liquid pump, to the working space for displacing the partition member in the same direction with the piston. The displacement of the partition member during the intake stroke is limited by a stop which is rigidly connected with the housing and mounted within the sealing liquid space. After the partition member is stopped by the stop, the piston continues its movement, the non-return valve connecting the sealing liquid space to the pump is open, and this space is refilled with a certain volume of sealing liquid to compensate for its leakage through the slit seal during the intake stroke. Then the cycle is repeated.

The main disadvantages of this construction are as follows:

absence of cooling of parts in frictional engagement since the piston is insulated by the partition member from the working liquid which has better parameters and physical properties as regards heat exchange than the sealing liquid;

discharge of sealing liquid into atmosphere resulting in additional energy losses for pumping it back into the sealing liquid space;

excessive length of the low-pressure pump for working liquid as compared to the length of the pump for sealing liquid, because the partition member is returned back into the initial position during the intake stroke under the pressure of the working liquid to bear against the stop mounted within the sealing liquid space. This also results in additional energy losses.

SUMMARY OF THE INVENTION

It is an object of the invention to improve the efficiency of the pump by reducing energy losses.

Another object of the invention is to improve the reliability by improving the heat exchange performance.

Still another object of the invention is to simplify the pump construction by using the energy of the sealing liquid.

With these and other objects in view, the invention contemplates a high-pressure pump comprising a housing accommodating a movable piston defining a chamber, a partition member which is movable and which divides the chamber into two spaces substantially insulated from each other of which one communicates with a source of working medium and with a user via non-return valves and the other, on one side, with a low pressure source of a sealing medium via a non-return valve, and on the other side, with the same source, via a slit seal comprising an annular space formed between the piston and the housing, and a stop for limiting the displacement of the partition member during the intake stroke which is rigidly connected with the housing, and according to the invention, the partition member is mounted coaxially with the piston, and the stop limiting the displacement of the partition member during the intake stroke is mounted within the space communicating with the source of working medium.

The provision of the partition member mounted coaxially with the piston produces a construction in which a substantial part of the surface of the piston is in contact with the working liquid which can cyclically cool the piston heated in the zone of the slit seal due to the conversion of energy of sealing liquid leakage through the slit space into heat and due to the presence of viscous friction forces of the sealing liquid. Cooling of a substantial part of the surface of the piston provides for reliable and prolonged operation of the pump without auxiliary cooling devices which is especially important for powerful high-speed pumps (500 kW and more).

The arrangement of the stop limiting the displacement of the partition member during the intake stroke within the working liquid space enables the return of the partition member back into the initial position where it bears against the stop under the pressure of the sealing liquid, rather than of the working liquid, whereby the working liquid pressure can be lower than the pressure of sealing liquid. Thus, minimum pressure of the working liquid source is determined as the pressure required for overcoming the resistance and inertial forces of the liquid so that in many instances the low-pressure pump may be dispensed with. This would reduce energy consumption, simplify the pump construction and lower its cost.

A hyropneumatic accumulator is preferably used as a low-pressure source of sealing medium in which energy is accumulated during the delivery stroke due to the admittance thereto of sealing liquid from the sealing liquid space through the slit seal, the energy being spent during the intake stroke for refilling the sealing liquid space through the non-return valve.

Use of a hydropneumatic accumulator to replace a low-pressure pump for sealing liquid reduces total energy consumption and simplifies the construction and control of the pump thus resulting in improved reliability thereof and lower cost.

The partition member preferably comprises an annular bushing having a surface of contact with the piston which is considerably smaller than the surface of contact with the housing.

This provides for compensation of errors of the manufacture of parts and for an increase of the piston surface which is cooled with working liquid thus resulting in a better cooling of the piston. As a result, the reliability of the pump is improved and service life of the parts thereof is prolonged.

The partition member may comprise an elastic membrane, and the stop may be made in the form of an annular bushing embracing the piston, the membrane edges being fastened to the bushing and the bushing having open radial holes, the number of holes being selected to provide minimum resitance offered to the working liquid.

This provides for an improved sensitivity of the partition member to changes in pressure of the working liquid and for a reduced difference in pressure of the working and sealing liquid, thereby prolonging the service life of the pump parts.

An example of the high-pressure pump incorporating the principle of the invention is a horizontal three-piston single-action pump with a piston diameter of 40 mm and piston stroke of 200 mm. The pump develops a pressure of 2000 kg/cm$^2$ at 153 piston reciprocations as the maximum stroke speed, with theoretical delivery of the working liquid of 1.7 l/s taking into account compressibility thereof. The working liquid comprises water or emulsion with an intake pressure of 8.7 kg/cm$^2$, and the sealing liquid is a heavy mineral oil with the hydropneumatic accumulator pressure of 25 kg/cm². The pump operates continuously. The dimensions of the high-pressure pump (without reduction gear and motor): length - 2500 mm, width - 1135 mm and height - 1100 mm. A standard pump drive is used for driving the piston.

BRIEF DESCRIPTION OF THE DRAWINGS

Other features and advantages of the invention will become apparent from the following description of specific embodiments thereof illustrated in the accompanying drawings, in which.

DETAILED DESCRIPTION

Figure 1:
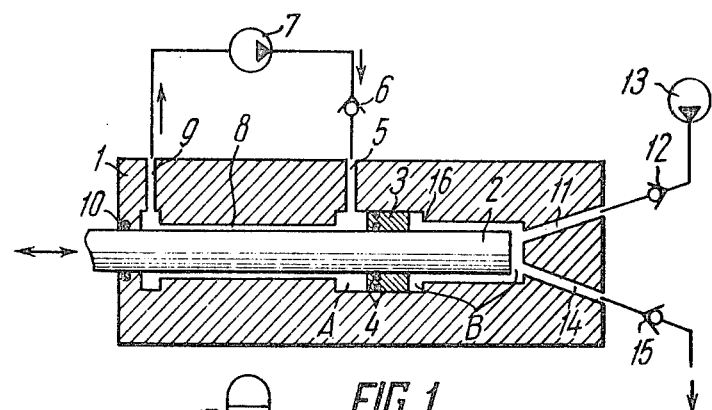
FIG. 1 diagrammatically shows a longitudinal section of the high-pressure pump with a coaxial partition member and a stop mounted within the working liquid space according to the invention.

A specific embodiment of the high-pressure pump will be given hereinbelow.

The high-pressure pump comprises a housing 1 (FIG. 1) which accommodates a movable piston 2 driven by any appropriate known means, a partition member 3 mounted coaxially with the piston 2 which divides the chamber between the piston 2 and the housing 1 into two spaces "A" and "B". The spaces "A" and "B" are insulated from each other by means of seals 4 of the partition member 3. The space "A" is connected, on one side, via a radial passage 5 in the housing 1 and a non-return valve 6, to a delivery line from a source 7 of a sealing liquid, and on the other side, via a slit seal 8 comprising an annular space formed between the piston 2 and the housing 1, and via a radial passage 9 of the housing 1, to an intake line of the source 7. In order to prevent the sealing liquid from leaking into the atmosphere, there is provided a seal 10 at the outlet of the piston 2 from the housing 1. The space "B" is connected, via a passage 11 of the housing 1 and a non-return valve 1, to a source 13 of the working liquid, as well as with a user, via a passage 14 of the housing 1 and a non-return valve 15 (the consumer is not shown). The partition member 3 is movable, and its displacement toward the space "B" with a working liquid is limited during the intake stroke by a stop 16 which is rigidly connected with the housing 1 and mounted within the working liquid space "B".

During the displacement of the piston 2 corresponding to the delivery stroke, the non-return valve 12 is closed, the non-return valve 6 is closed, and the non-return valve 15 is open after a desired pressure of working liquid in the space "B" is achieved to feed the working liquid to a consumer. The pressure of working liquid in the space "B" is transmitted through the partition member 3 to the sealing liquid space "A". The pressure of the working liquid is greater than the pressure of the sealing liquid only by an amount determined by the inertia of the partition member 3 and friction at the contact seals 4 of the partition member 3.

Under the action of a pressure nearly equal to the working pressure, the sealing liquid from the space "A" flows through the slit seal 8 and radial passage 9 of the housing 1 into the intake line of the source 7. Thus the partition member 3 moves in the opposite direction relative to the piston 2 by an amount corresponding to the compressible volume of the space "A" and to the volume of leakage of the sealing liquid through the slit seal 8 during the delivery stroke.

During the movement of the piston 2 corresponding to the intake stroke, the non-return valve 15 is closed, and the non-return valves 12 and 6 are open. The working liquid fills the space "B". Due to the fact that the pressure of the sealing liquid source 7 is greater than the pressure of the working liquid source 13, the partition member 3 is displaced toward the space "B" until it bears against the stop 16 thus returning to the initial position. Then the cycle is repeated.

Figure 2:
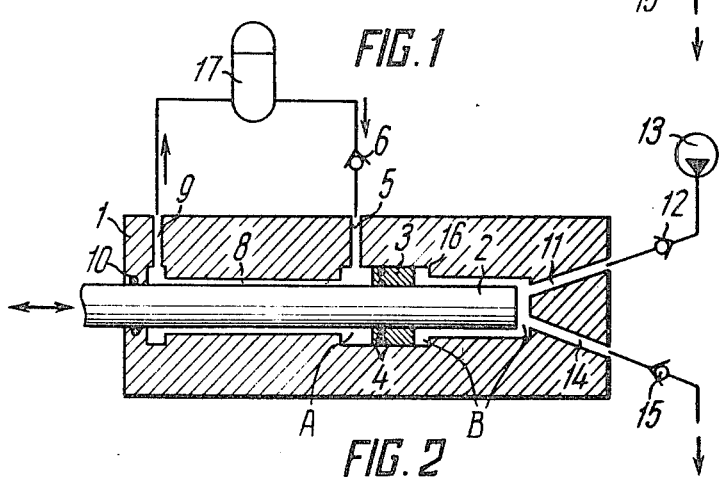
FIG. 2 shows a longitudinal section of the high-pressure pump with a hydropneumatic accumulator according to the invention.

In another embodiment of the high-pressure pump shown in FIG. 2, the pump comprises the same basic elements as described above, except for the low-pressure sealing liquid source which in this embodiment comprises a hydropneumatic accumulator 17 used for accumulating energy during the delivery stroke to be spent during the intake stroke.

The pump shown in FIG. 2 functions in the same manner as the pump described with reference to FIG. 1. In this case the pressure of sealing liquid in the hydropneumatic accumulator 17 is also greater than the pressure of the working liquid source 13. During the delivery stroke the sealing liquid from the space "A" flows through the slit seal 8 and the radial passage 9 into the hydropneumatic accumulator 17 to increase the volume of sealing liquid, and the gas medium in the hydropneumatic accumulator 17 is compressed to increase pressure therein. During the intake stroke, the same volume of sealing liquid is returned from the hydropneumatic accumulator 17, via the non-return valve 6 and the passage 5, into the space "A" due to a fixed initial position of the partition member 3 which bears against the stop 16.

Figure 3:
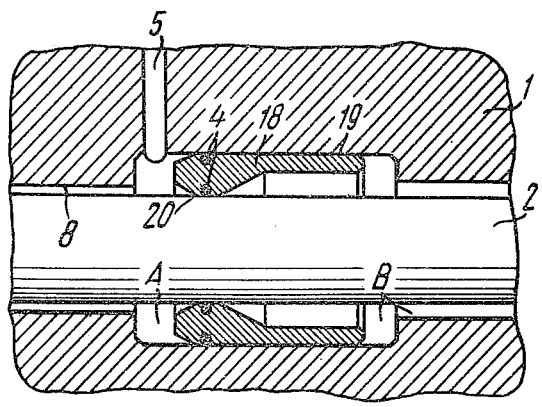
FIG. 3 shows a longitudinal section of an embodiment of the pump according to the invention having a partition member comprising an annular bushing.

FIG. 3 shows an embodiment of the partition member which comprises an annular bushing 18 having a surface 19 in contact with the housing 1 which is substantially larger than the surface 20 in contact with the piston 2 only required for operation of the seals 4.

This construction of the coaxial partition member 18 eliminates the errors of the manufacture of parts and provides for increased surface of the piston 2 to be cooled with working liquid within the space "B".

Figure 4:
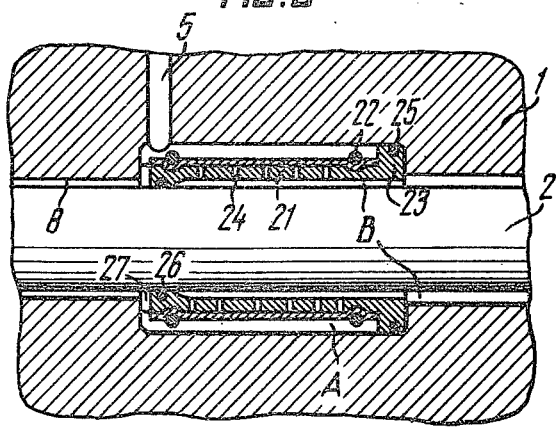
FIG. 4 shows a longitudinal section of another embodiment of the partition member comprising an elastic membrane.

FIG. 4 shows an embodiment of the partition member comprising an elastic membrane 21. The membrane has its edges fastened by means of rings 22 to a bushing 23 which forms a stop and is mounted to the housing 1. The bushing 23 has open radial bores 24, a seal 25 and a seal 26. An end face of the bushing 23 is provided with slots 27 communicating the sealing liquid space "A" with the slit seal 8. The number of the bores 24 is selected to provide minimum resistance offered to the working liquid.

During the delivery stroke, the working liquid from the space "B" flows through the radial bores 24 of the bushing 23 under the membrane 21 to expand the membrane by an amount corresponding to the compressible volume of the sealing liquid within the space "A" and to the volume of the sealing liquid leaking through the slit seal 8.

During the intake stroke, since the pressure of the sealing liquid is greater than the pressure of the working liquid source 13, the membrane 21 is returned to the initial position until it bears against the stop which is formed by the outer surface of the bushing 23. The space "A" is refilled with sealing liquid. Then the cycle is repeated.

What is claimed is:

1. A high-pressure pump comprising: a housing; a movable piston mounted within said housing and defining a chamber; a movable partition member arranged within said housing, said partition member dividing said chamber into first and second spaces substantially insulated from each other and mounted coaxially with the piston; a working medium source; a low-pressure sealing medium source; a first non-return valve connecting the first space with said working medium source; a second non-return valve connecting said first space with a consumer; a third non-return valve connecting one side of the second space with said low-pressure sealing medium source; a slit seal comprising an annular space formed between the inner surface of said housing and the outer surface of said piston, said annular space connecting the other side of said second space with said low-pressure sealing medium source; a stop for limiting the displacement of said partition member during the intake stroke, said stop being arranged within said housing, rigidly connected thereto and mounted within said first space, said partition member comprising an elastic membrane, said stop comprising a bushing embracing said piston, said flexible membrane having edges fastened to said bushing, the outer surface of the bushing limiting the displacement of said membrane during the intake stroke, said bushing having open radial bores, the number of bores being selected to provide for minimum resistance offered to the working liquid.

2. A high-pressure pump comprising: a housing; a movable piston arranged within said housing and defining a chamber; a partition member constituted as a resilient membrane movably arranged within said housing to divide said chamber into two substantially insulated spaces, said membrane having opposite ends, said partition member being coaxial with said piston; a working medium source; a low-pressure sealing medium source; a first non-return valve connecting one of said spaces to said working medium source; a second non-return valve connecting the same space with a consumer; a third non-return valve connecting one side of the second of said spaces to said low-pressure sealing medium source; a slit seal constituted as an annular space defined between the inner surface of said housing and the outer surface of said piston, said annular space connecting the other side of said space in communication with said sealing medium source to said low-pressure sealing medium source; stop means for limiting the movement of said partition member, said stop means comprising a bushing arranged within said housing and disposed within said space in communication with said working medium source around said piston, and connected to the ends of said resilient membrane, said bushing having an outer surface limiting movement of said membrane during the intake stroke, said bushing further having open radial bores facing said piston, the number of said bores being selected to provide for minimum resistance of the sealing medium.

* * * * *